US009947972B2

United States Patent
Ozawa et al.

(10) Patent No.: US 9,947,972 B2
(45) Date of Patent: Apr. 17, 2018

(54) BATTERY PACK AND METHOD OF INSPECTING STORAGE STATE OF SECONDARY BATTERY IN BATTERY PACK

(75) Inventors: Atsushi Ozawa, Kanagawa (JP); Shin Hotta, Tokyo (JP); Kentaro Marutani, Kanagawa (JP); Shinichi Uesaka, Kanagawa (JP)

(73) Assignee: Murata Manufacturing Co., Inc., Kyoto (JP)

( * ) Notice: Subject to any disclaimer, the term of this patent is extended or adjusted under 35 U.S.C. 154(b) by 327 days.

(21) Appl. No.: 13/822,534

(22) PCT Filed: Sep. 5, 2011

(86) PCT No.: PCT/JP2011/070112
§ 371 (c)(1),
(2), (4) Date: Mar. 12, 2013

(87) PCT Pub. No.: WO2012/036004
PCT Pub. Date: Mar. 22, 2012

(65) Prior Publication Data
US 2013/0181721 A1 Jul. 18, 2013

(30) Foreign Application Priority Data

Sep. 16, 2010 (JP) .................................. 2010-207524

(51) Int. Cl.
*H02J 7/00* (2006.01)
*H01M 10/42* (2006.01)
(Continued)

(52) U.S. Cl.
CPC ....... *H01M 10/482* (2013.01); *H01M 2/1077* (2013.01); *H01M 10/425* (2013.01);
(Continued)

(58) Field of Classification Search
CPC .................................................. H01M 10/482
(Continued)

(56) References Cited

U.S. PATENT DOCUMENTS 5,994,878 A * 11/1999 Ostergaard et al. .......... 320/132
6,094,031 A *  7/2000 Shimane et al. .............. 320/118
(Continued)

FOREIGN PATENT DOCUMENTS

JP    2000201436     7/2000
JP    2005353518    12/2005
(Continued)

OTHER PUBLICATIONS

Reasons for refusal notice issued in connection with Japanese Patent Application No. 2010-207524, dated Sep. 9, 2014. (4 pages).

*Primary Examiner* — Samuel Berhanu
*Assistant Examiner* — Tarikh Rankine
(74) *Attorney, Agent, or Firm* — K&L Gates LLP

(57) ABSTRACT

A battery pack and a method of inspecting a storage state of a secondary battery in the battery pack are provided. In the method of inspecting a storage state of a secondary battery in the battery pack, the battery pack includes (A) a plurality of secondary batteries and (B) a housing, the housing having a plurality of storage sections and containing the secondary batteries in the respective storage sections; a conductive member 30 is attached to an outer surface of each of the secondary batteries made of a non-conductive material; each of the storage sections is provided with at least two detection sections; and depending on a storage state of each of the secondary batteries in each of the storage sections, two detection sections are in contact with the conductive member, or at least one detection section is not in contact with the conductive member.

17 Claims, 7 Drawing Sheets

(51) Int. Cl.
*H01M 10/48* (2006.01)
*H01M 10/04* (2006.01)
*H01M 2/10* (2006.01)
*H01M 2/00* (2006.01)
*G01R 31/36* (2006.01)
*H01M 10/0525* (2010.01)

(52) U.S. Cl.
CPC .... *H01M 10/4207* (2013.01); *H01M 10/0525* (2013.01); *H01M 2200/00* (2013.01); *H01M 2220/20* (2013.01)

(58) Field of Classification Search
USPC ......................................................... 324/434
See application file for complete search history.

(56) References Cited

U.S. PATENT DOCUMENTS

| | | | |
|---|---|---|---|
| 6,232,013 B1* | 5/2001 | Clarke et al. | 429/100 |
| 6,265,849 B1 | 7/2001 | Ricordel | |
| 8,765,027 B2* | 7/2014 | Lussey | G01L 1/20 252/500 |
| 8,829,857 B2* | 9/2014 | Minamiura | 320/136 |
| 2005/0206494 A1* | 9/2005 | Ko | H01C 7/008 338/22 R |
| 2007/0008141 A1* | 1/2007 | Sweetland | G06K 17/00 340/572.7 |
| 2007/0229026 A1* | 10/2007 | Morioka | H01M 10/441 320/112 |
| 2009/0169977 A1* | 7/2009 | Sfarzo | H01M 6/5044 429/50 |
| 2010/0019730 A1* | 1/2010 | Chueh et al. | 320/135 |
| 2010/0211341 A1* | 8/2010 | Kinoshita | 702/63 |
| 2010/0286938 A1* | 11/2010 | Kaneko | 702/63 |
| 2013/0171481 A1* | 7/2013 | Hotta et al. | 429/50 |

FOREIGN PATENT DOCUMENTS

| | | | |
|---|---|---|---|
| JP | 2006324075 | 11/2006 | |
| JP | 2007-194052 | 8/2007 | |
| JP | 2007273315 | 10/2007 | |
| JP | 2007305344 | 11/2007 | |
| JP | 2008021619 | 1/2008 | |
| JP | 2008204878 | 9/2008 | |
| JP | 2008-275323 | 11/2008 | |
| JP | 2009-016249 | 1/2009 | |
| JP | 2009151952 | 7/2009 | |
| JP | 2010190663 | 9/2010 | |
| JP | 2012-064426 | 3/2012 | |
| WO | WO 2010134853 A1 * | 11/2010 | 324/434 |

* cited by examiner

[ FIG. 1 ]
(A)
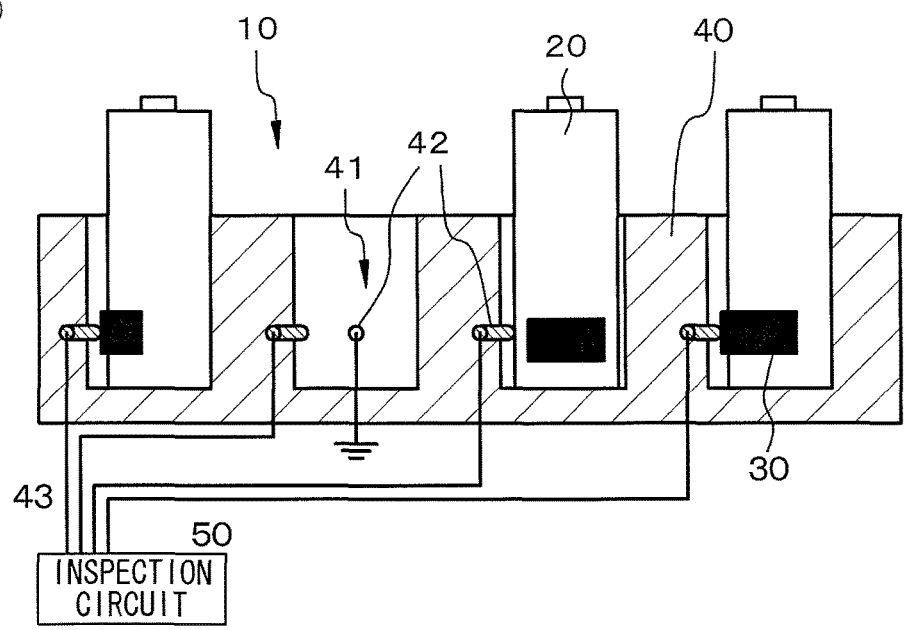
(B)
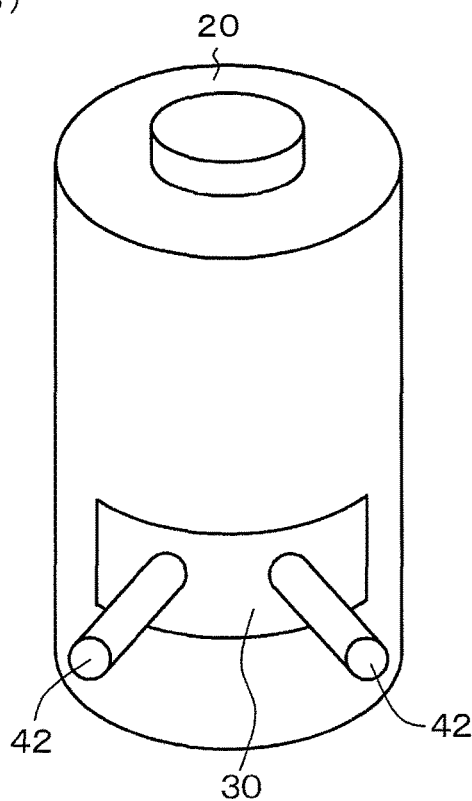
(C)
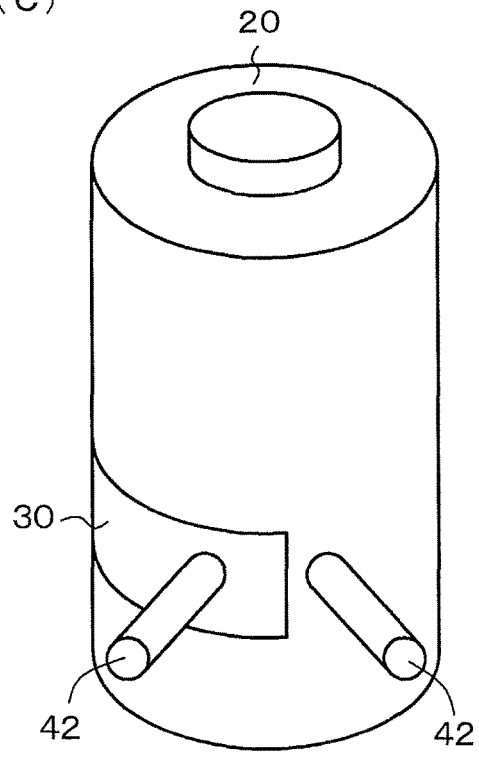

[FIG. 2]
(A)
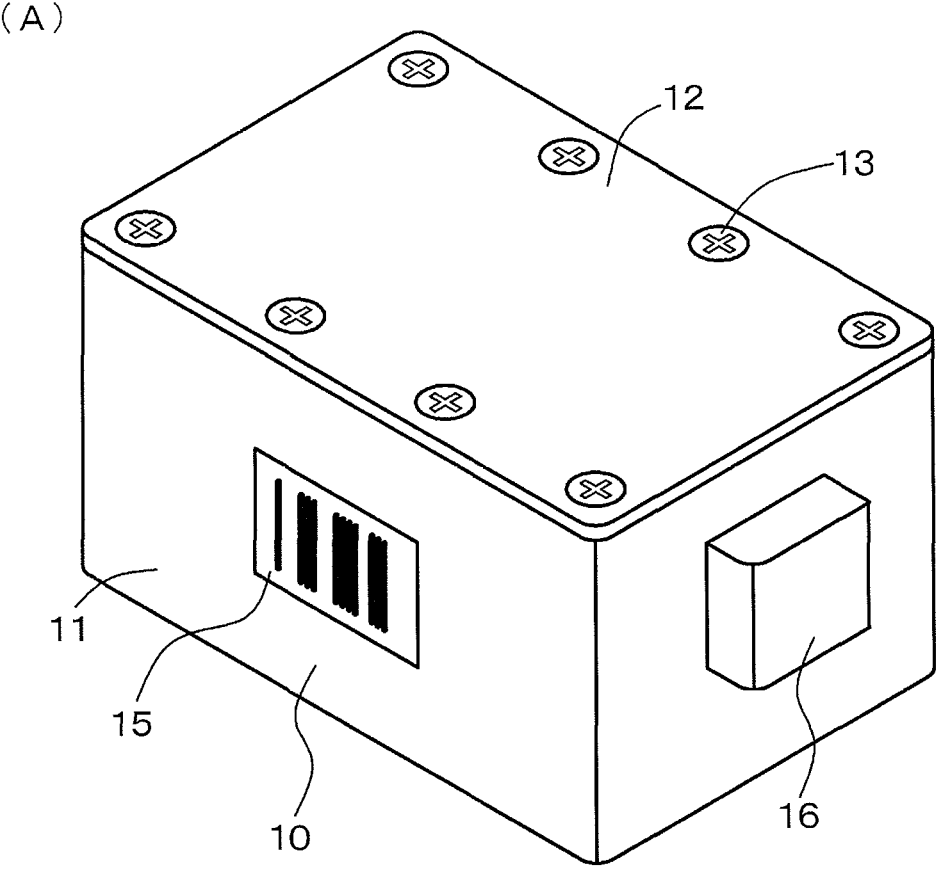
(B)
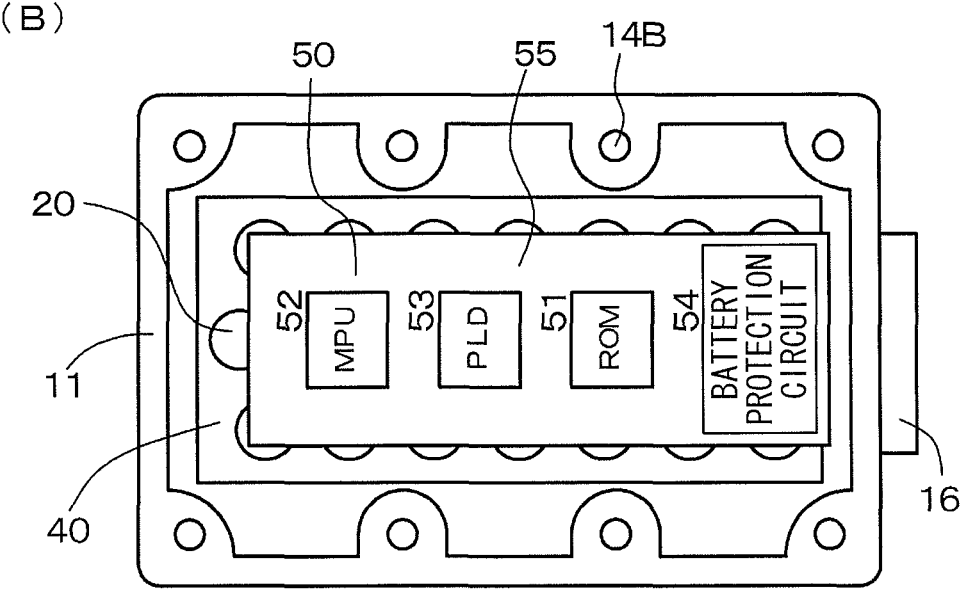

[FIG. 3]
(A) [ARRANGEMENT STATE OF 0 DEGREE]
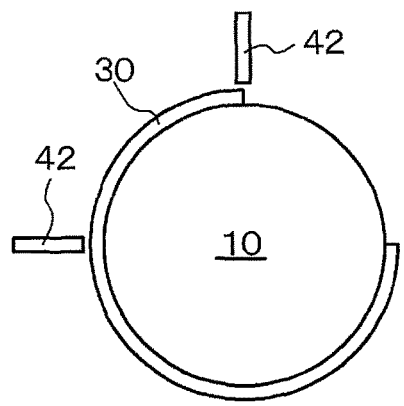
(B) [ARRANGEMENT STATE OF 90 DEGREES]
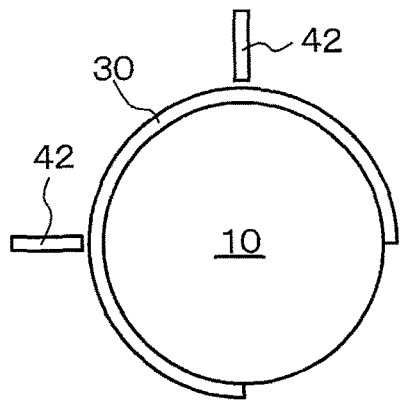
(C) [ARRANGEMENT STATE OF 180 DEGREES]
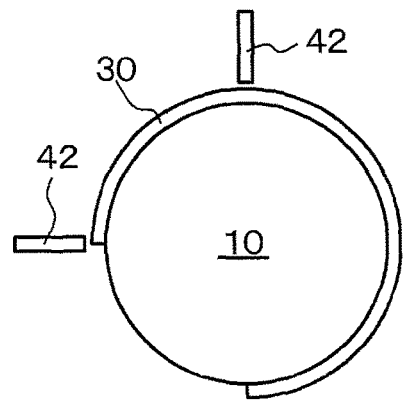
(D) [ARRANGEMENT STATE OF 225 DEGREES]
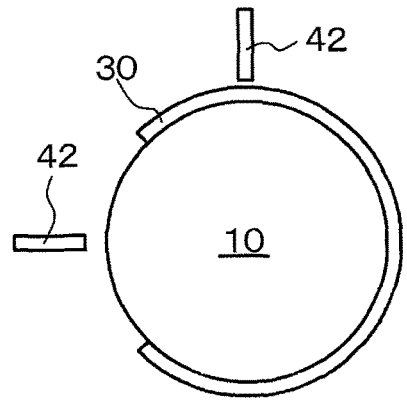
(E) [ARRANGEMENT STATE OF 270 DEGREES]
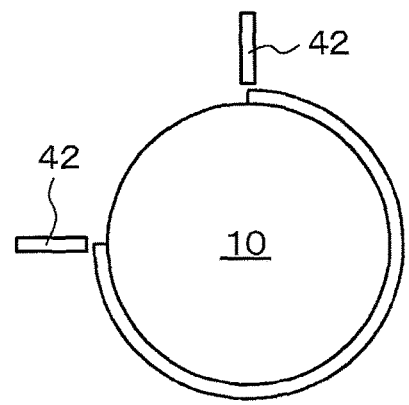
(F) [ARRANGEMENT STATE OF 315 DEGREES]
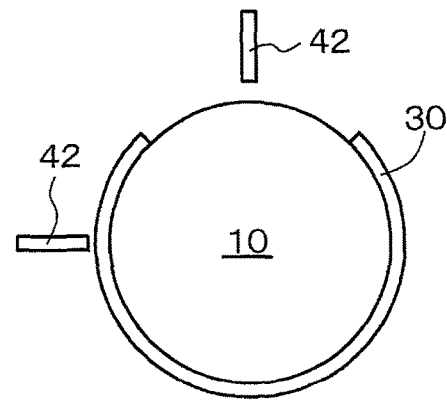

[ FIG. 4 ]
(A)
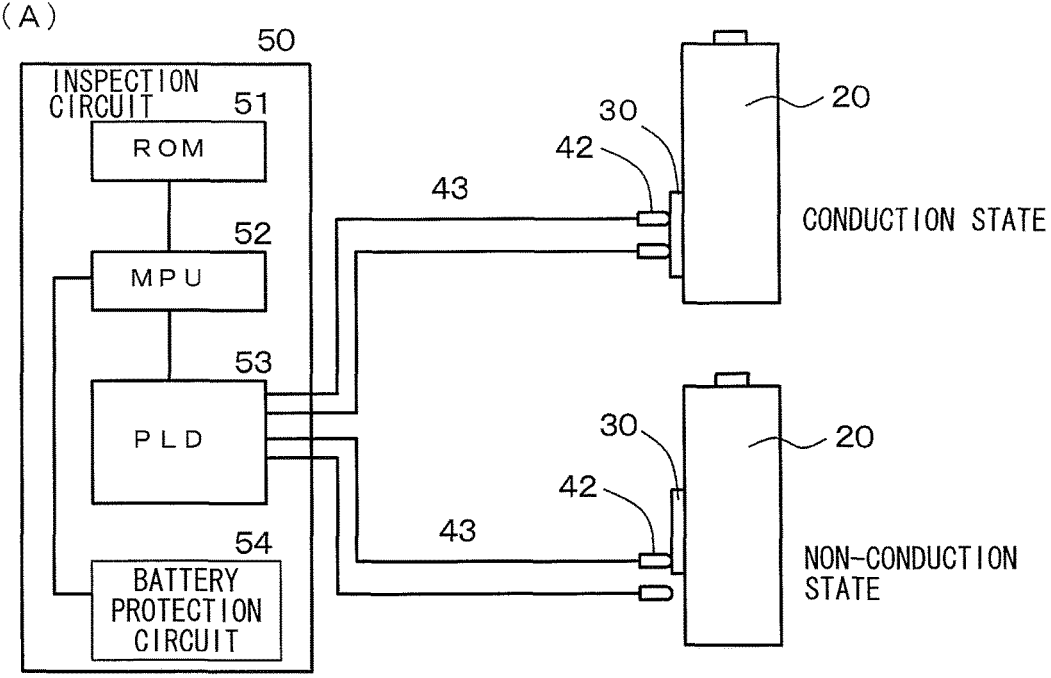
(B)

[ FIG. 5 ]
(A) 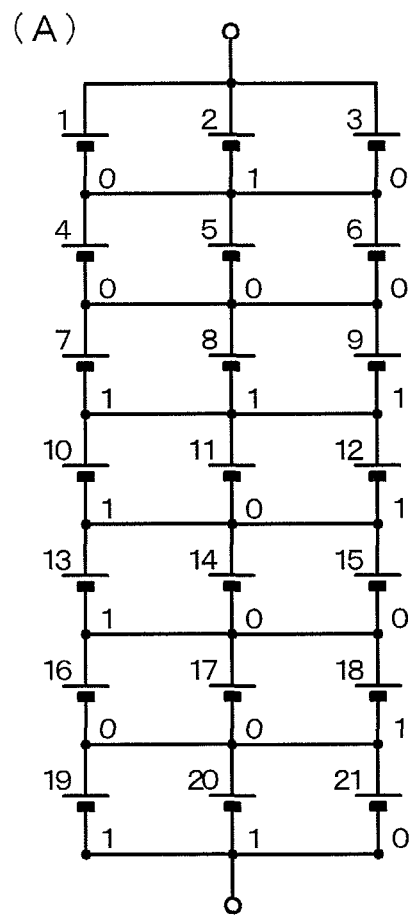
(B) 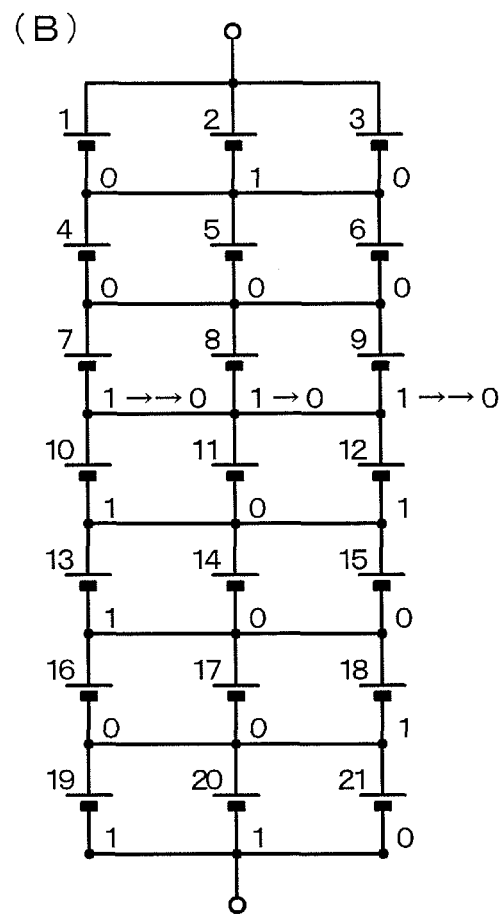

[FIG. 6]
(A)
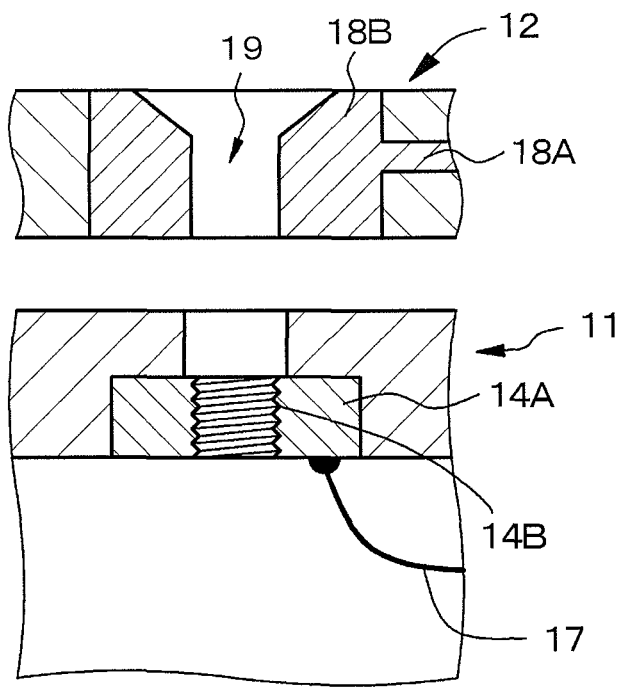
(B)
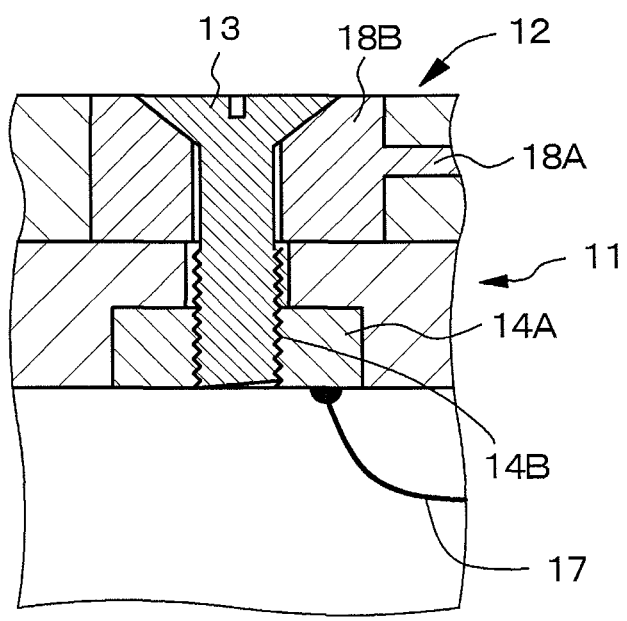

[ FIG. 7 ]
(A) 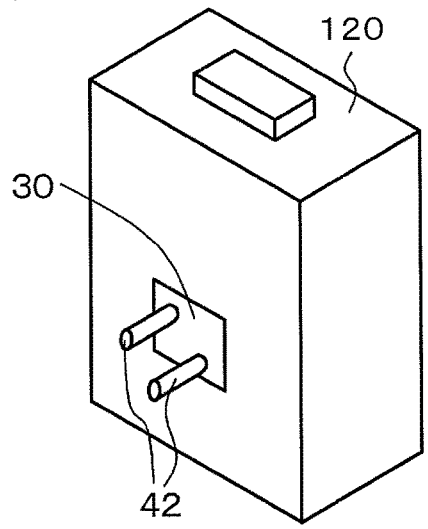
(B) 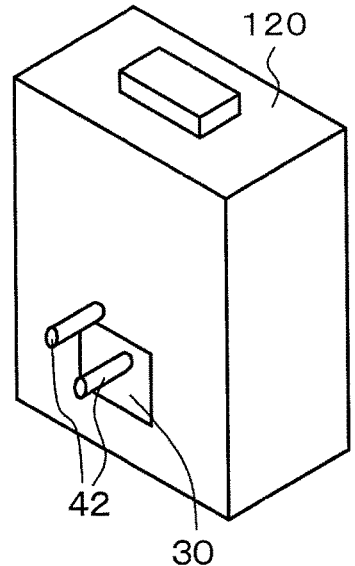
(C) 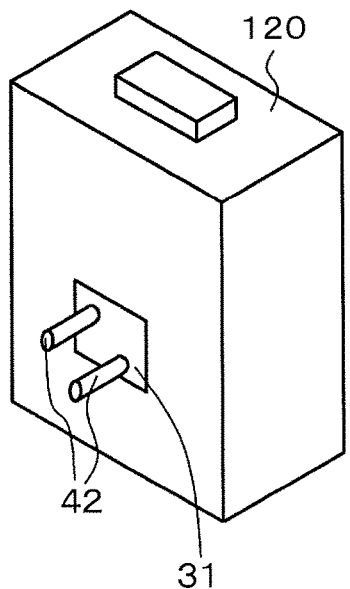
(D) 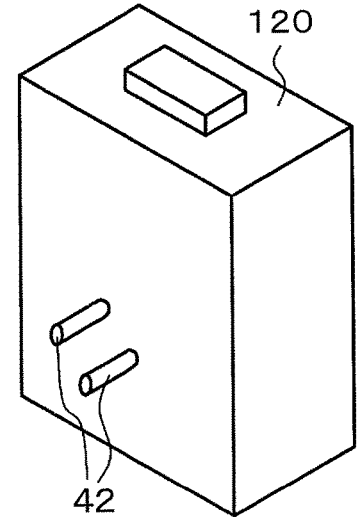

BATTERY PACK AND METHOD OF INSPECTING STORAGE STATE OF SECONDARY BATTERY IN BATTERY PACK

CROSS REFERENCES TO RELATED APPLICATIONS

The present application is a national stage of International Application No. PCT/JP2011/070112 filed on Sep. 5, 2011 and claims priority to Japanese Patent Application No. 2010-207524 filed on Sep. 16, 2010, the disclosure of which is incorporated herein by reference.

BACKGROUND

The present invention relates to a battery pack, and to a method of inspecting a storage state of a secondary battery in the battery pack.

A battery pack has been heretofore used for various portable apparatuses such as a mobile phone, a digital still camera, a portable game machine, a notebook personal computer, and an electric power tool. Currently, applications thereof are not limited thereto, and the battery pack has been increasingly used in the fields necessitating a higher output and a higher capacity such as an electric assist bicycle, an electric vehicle, and a home electric storage device.

Examples of secondary batteries built into a battery pack include a lithium ion secondary battery, which is one of the most-mainly-used secondary batteries therefor. The lithium ion secondary battery has multiple characteristics as follows. That is, the lithium ion secondary battery is repeatedly usable by charging, has a high voltage output, has high energy density, has little self-discharge, and has a long life. Therefore, the lithium ion secondary battery is used in an extremely-broad range. However, since the lithium ion secondary battery contains a combustible material, adequate care needs to be exercised in handling thereof. Further, for addressing needs of apparatuses such as a higher output and a higher capacity, the number of cases in which secondary batteries (single cells) are multiply-series-connected or multiply-parallel-connected, and are used in a state of a battery pack (assembled battery), and therefore, more proper handling thereof is desired. Furthermore, in order to determine whether or not a battery pack mounted on an apparatus is safely usable for the apparatus, many battery certification systems for acting certification between an apparatus and a battery pack have been introduced. Accordingly, usage of an inappropriate battery pack is allowed to be restricted by various certification methods including whether or not an appropriate battery pack is used and whether or not an appropriate protection circuit is included.

There is concern that what we call an altered battery pack is manufactured and distributed by disassembling a spent battery pack, taking out a secondary battery therefrom, and building the secondary battery into other battery pack. In such an altered battery pack, undesired over-charge, undesired over-discharge, and/or the like may occur by building in an inappropriate secondary battery, and therefore, a safety issue easily occurs. Therefore, it is strongly desired to appropriately suppress manufacture and distribution of the altered battery pack by disqualifying such an altered battery pack from certification and/or substantially disabling a function of the altered battery pack.

As such a battery pack aimed at preventing alteration, a battery pack provided with an IC tag in which predetermined information is recorded is known from, for example, Japanese Unexamined Patent Application Publication No. 2006-324075. Further, a battery pack in which a detachment recognition tape having a detachment recognition function with which a fact that a battery has been separated from a package case is certified is adhered to a region from the battery to a member adjacent thereto is known from Japanese Unexamined Patent Application Publication No. 2005-353518.

CITATION LIST

Patent Literature

[PLT 1]: Japanese Unexamined Patent Application Publication No. 2006-324075
[PLT 2]: Japanese Unexamined Patent Application Publication No. 2005-353518

SUMMARY

However, in the technology disclosed in Japanese Unexamined Patent Application Publication No. 2006-324075, since the IC tag is used, there is a disadvantage that the manufacturing cost of the battery pack is increased. In addition thereto, in the case where the battery pack is disassembled so that the IC tag is not broken, such technology becomes ineffective for preventing alternation. Further, in the technology disclosed in Japanese Unexamined Patent Application Publication No. 2006-324075, it is not possible to prevent taking a battery out of the battery pack and manufacturing an altered battery pack.

Therefore, it is an object of the present invention to provide a battery pack capable of preventing an altered battery pack from being manufactured by a simple structure and a simple construction, and to a method of inspecting a storage state of a secondary battery in the battery pack.

A battery pack according to a first aspect of the present invention to achieve the foregoing object includes a plurality of secondary batteries and a housing, the housing having a plurality of storage sections and containing the secondary batteries in the respective storage sections. A conductive member is attached to an outer surface of each of the secondary batteries made of a non-conductive material. Each of the storage sections is provided with at least two detection sections. Depending on a storage state of each of the secondary batteries in each of the storage sections, two detection sections are in contact with the conductive member, or at least one detection section is not in contact with the conductive member.

A method of inspecting a storage state of a secondary battery in a battery pack of the present invention to achieve the foregoing object is a method of inspecting a storage state of a secondary battery in the battery pack according to the first aspect of the present invention described above. A conduction/non-conduction state between detection sections in each of the secondary batteries is examined, and an examined result is compared to a previously found conduction/non-conduction initial value, and in the case of mismatch thereof, the conduction/non-conduction initial value is changed.

A battery pack according to a second aspect of the present invention to achieve the foregoing object includes a plurality of secondary batteries, a housing, the housing having a plurality of storage sections and containing the secondary batteries in the respective storage sections, and an inspection circuit. A conductive member is attached to an outer surface of each of the secondary batteries made of a non-conductive material. Each of the storage sections is provided with at least two detection sections. Depending on a storage state of each of the secondary batteries in each of the storage sections, two detection sections are in contact with the conductive member, or at least one detection section is not in contact with the conductive member. The inspection circuit examines a conduction/non-conduction state between the detection sections in each of the secondary batteries, compares an examined result to a previously found conduction/non-conduction initial value, and in the case of mismatch thereof, changes the conduction/non-conduction initial value.

In the present invention, the battery pack has a simple structure and a simple configuration in which the conductive member is attached to the outer surface of each of the secondary batteries made of a non-conductive material (insulating material) and each of the respective storage sections is provided with at least two detection sections. However, taking out a secondary battery and re-storage of a/the secondary battery are allowed to be recognized. Therefore, alteration of a battery pack such as illegal replacement of a secondary battery is allowed to be appropriately and easily detected, and manufacturing an altered battery pack is allowed to be securely prevented.

Additional features and advantages are described herein, and will be apparent from the following Detailed Description and the figures.

BRIEF DESCRIPTION OF THE FIGURES

FIGS. 1(A) to 1(C) are a schematic cross sectional view of a housing section configuring a battery pack according to a first embodiment and schematic perspective views of a cylindrical-type secondary battery.

FIGS. 2(A) and 2(B) are a schematic perspective view of a battery pack and a schematic view in a state that a cover of the battery pack is removed.

FIGS. 3(A) to 3(F) are diagrams schematically illustrating arrangement states of a secondary battery in the battery pack according to the first embodiment and states of contact between detection sections and a conductive member.

FIGS. 4(A) and 4(B) are a conceptual diagram of an inspection circuit and the like in the battery pack according to the first embodiment and a diagram illustrating an output of an inspection signal and the like.

FIGS. 5(A) and 5(B) are diagrams conceptually illustrating conduction/non-conduction initial values before and after being changed.

FIGS. 6(A) and 6(B) are schematic and partial cross sectional views of a main body section, a closing member, and the like.

FIGS. 7(A) to 7(D) are schematic perspective views of a square-type secondary battery.

DETAILED DESCRIPTION

The present invention will be hereinafter described based on an embodiment with reference to the drawings. However, the present invention is not limited to the embodiment, and various numerical values and various materials in the embodiment are merely exemplifications. It is to be noted that the description will be given in the following order.
1. General Description of Battery Packs according to First Aspect and Second Aspect of Present Invention and Method of Inspecting Storage State of Secondary Battery in Battery Pack of Present Invention
2. First Embodiment (Battery Packs according to First Aspect and Second Aspect of Present Invention and Method of Inspecting Storage State of Secondary Battery in Battery Pack of Present Invention) and Others

[General Description of Battery Packs according to First Aspect and Second Aspect of Present Invention and Method of Inspecting Storage State of Secondary Battery in Battery Pack of Present Invention]

In the battery pack according to the first aspect or the second aspect of the present invention or the battery pack in the method of inspecting a storage state of a secondary battery in a battery pack of the present invention (hereinafter collectively referred to as "battery pack of the present invention or the like" in some cases for convenience), the conductive member may be attached to the outer surface of each of the secondary batteries so that a probability of a case in which two detection sections are in contact with the conductive member and a probability of a case in which at least one detection section is not in contact with the conductive member become a predetermined value depending on a storage state of the secondary batteries in the storage sections. In this case, as the predetermined probability value, 0.5 may be exemplified. Incidentally, it is needless to say that when the battery pack is practically assembled, a ratio of a case in which two detection sections are in contact with the conductive member and at least one detection section is not in contact with the conductive member absolutely depends on a probability. What matters is that "the conductive member is attached to the outer surface of each of the secondary batteries" so that the probability of the case in which two detection sections are in contact with the conductive member and the probability of the case in which at least one detection section is not in contact with the conductive member become a predetermined value such as 0.5 depending on a storage state of secondary batteries in the storage sections.

In the battery pack of the present invention or the like including the foregoing preferred form, two or more detection sections may be provided in each of the storage sections so that the probability of the case in which the two detection sections are in contact with the conductive member and the probability of the case in which at least one detection section is not in contact with the conductive member become the predetermined value depending on the storage state of the secondary batteries in the storage sections. In this case, as the predetermined probability value, 0.5 may be exemplified. Incidentally, it is needless to say that when the battery pack is practically assembled, the ratio of the case in which two detection sections are in contact with the conductive member and at least one detection section is not in contact with the conductive member absolutely depends on the probability. What matters is that "two or more detection sections are provided in each of the storage sections" so that the probability of the case in which two detection sections are in contact with the conductive member and the probability of the case in which at least one detection section is not in contact with the conductive member become the predetermined value such as 0.5 depending on the storage state of the secondary batteries in the storage sections.

In the battery pack of the present invention or the like including the foregoing preferred form, a non-conductive member having the same appearance as that of the conductive member may be attached to the outer surface of each of the secondary batteries made of the non-conductive material (insulating material). By attaching the non-conductive member as a dummy, it becomes difficult to distinguish the conductive member from the non-conductive member, and prevention of manufacturing an altered battery pack is allowed to be inhibited more effectively.

Further, in the battery pack of the present invention or the like including the foregoing preferred form and the foregoing configuration, a memory means is further included. Depending on storage states of the secondary batteries in the storage sections, secondary batteries with the conductive member in contact with two detection sections and secondary batteries with the conductive member not in contact with at least one detection section may be memorized in the memory means as data. Incidentally, in this case, where the number of the secondary batteries is N, the foregoing data may be, for example, N-bit data. Specifically, for example, the secondary battery with the conductive member in contact with two detection sections is set to data "1" or data "0", the secondary battery with the conductive member not in contact with at least one detection section is set to data "0" or data "1," and a data string configured of "1" and "0" may be memorized in the memory means. It is to be noted that in the case where three detection sections are provided, 2N-bit data string is obtained.

Further, in the battery pack of the present invention or the like including the foregoing preferred form and the foregoing configuration, when each of the secondary batteries is stored in each of the storage sections, the conductive member is preferably not viewed. Furthermore, in the battery pack of the present invention or the like including the foregoing preferred form and the foregoing preferred configuration, the conductive member or the non-conductive member may be a seal member made of a conductive material or a non-conductive material (insulating material).

In the method of inspecting a storage state of a secondary battery in a battery pack configured of the battery pack of the present invention or the like including the foregoing preferred form and the foregoing configuration (hereinafter referred to as "inspection method of the present invention" in some cases for convenience), or the battery pack according to the second aspect of the present invention, mismatch of the conduction/non-conduction initial value may occur from taking out any of the secondary batteries from any of the storage sections. In this case, when any of the secondary batteries is taken out from any of the storage sections, and thereafter, a/the secondary battery is stored in the storage section, a conduction/non-conduction state between detection sections in the secondary battery may be examined, an examined result thereof may be compared to a changed conduction/non-conduction initial value, and a function of the battery pack may be stopped in the case of mismatch thereof.

In the inspection method of the present invention including the foregoing preferred form or the battery pack according to the second aspect of the present invention, the battery pack may further include a memory means, conduction/non-conduction states between detection sections in all secondary batteries may be previously examined, and examined results thereof may be memorized in the memory means, as the conduction/non-conduction initial value.

Further, in the inspection method of the present invention including the foregoing preferred form or the battery pack according to the second aspect of the present invention, the conduction/non-conduction state between the detection sections in each of the secondary batteries may be examined at predetermined time intervals.

Further, in the case where any of the secondary batteries is taken out from any of the storage sections, and thereafter, a/the secondary battery is stored in the storage section, a conduction/non-conduction state between the detection sections in the secondary battery may be examined; the examined result may be compared to a changed conduction/non-conduction initial value; in the case of mismatch thereof, conduction/non-conduction states between the respective detection sections in the all secondary batteries may be examined under predetermined conditions; the results thereof may be set to a new conduction/non-conduction initial value, and stop of the function of the battery pack may be released.

In the battery pack according to the first aspect or the second aspect of the present invention including the foregoing preferred form and the foregoing configuration or the method of inspecting a storage state of a secondary battery in a battery pack of the present invention including the foregoing preferred form and the foregoing configuration (hereinafter collectively and simply referred to as "the present invention" in some cases), it is enough that at least two detection sections are provided in each of the storage sections, and in some cases, three or more detection sections may be provided. For example, the detection section may be configured of a pin-like projection section that projects from the storage section and is made of a conductive material.

Examples of the secondary batteries include a lithium ion secondary battery. However, the secondary battery type is not limited thereto. The type of a secondary battery to be used may be selected as appropriate according to desired characteristics. The configuration and the structure of the secondary battery may be a known configuration and a known structure. The shape of the secondary battery may be a known cylindrical type or a known square type. The housing having the plurality of storage sections may be made of a non-conductive material (insulating material) such as a plastic material. The housing including the storage section, the detection section, and a wiring extending from the detection section to the outside of the housing is allowed to be formed integrally. Storing the secondary batteries into the respective storage sections may be made automatically with the use of a machine, or may be made by a worker.

The wiring extending from the detection section to the outside of the housing is connected to the inspection circuit included in the battery pack. The inspection circuit includes the foregoing memory means (for example, configured of an EEROM). Further, the inspection circuit further includes an MPU and a programmable logic device (PLD). An electric source of the inspection circuit may be the secondary batteries configuring the battery pack. The inspection circuit may send a pulsed inspection signal to the detection section. Alternatively, the same signal may be concurrently sent to the all detection sections as an inspection signal. The battery pack includes a known battery protection circuit. To stop a function of the battery pack, the battery protection circuit may be activated.

The battery pack in the present invention may be applied to, for example, an electric vehicle (EV), an electric motorcycle, an electric assist bicycle, an electric power tool, a home energy server (home electric storage device), a personal computer, a mobile phone, a PDA, a digital still camera, a video camcoder, a camcoder, a music player, a medical device, a toy, and the like.

First Embodiment

A first embodiment relates to the battery packs according to the first aspect and the second aspect of the present invention, and to the method of inspecting a storage state of a secondary battery in a battery pack of the present invention. FIG. 1(A) illustrates a schematic cross-sectional view of a housing section configuring a battery pack of the first embodiment. FIGS. 1(B) and 1(C) illustrate schematic perspective views of a cylindrical-type secondary battery. Further, FIGS. 2(A) and 2(B) illustrate a schematic perspective view of the battery pack and a schematic view of a state in which a cover of the battery pack is removed. FIGS. 3(A) to 3(F) schematically illustrate arrangement states of a secondary battery in the battery pack of the first embodiment and states of contact between a detection section and a conductive member. Further, FIGS. 4(A) and 4(B) illustrate a conceptual diagram of an inspection circuit and the like in the battery pack of the first embodiment and a diagram showing an output and the like of an inspection signal. FIGS. 5(A) and 5(B) conceptually illustrate conduction/non-conduction initial values before and after being changed.

A battery pack 10 of the first embodiment includes (A) a plurality of secondary batteries 20 and (B) a housing 40 having a plurality of storage sections 41 and containing the secondary batteries 20 in the respective storage sections 41. The battery pack 10 further includes an inspection circuit (an inspection means or an inspection apparatus) 50.

Further, a conductive member 30 is attached to an outer surface of each of the secondary batteries 20 made of a non-conductive material. Specifically, the non-conductive material configuring the outer surface of each of the secondary batteries 20 is made of a polyolefin resin. The conductive member 30 is configured of a seal member made of a conductive material such as aluminum, that is, configured of a strip-shaped member in which an adhesive layer is formed on the rear surface thereof. The conductive member 30 is adhered to the outer surface of each of the secondary batteries 20. It is to be noted that, in some cases, a seal member configured of a non-conductive member 31 such as aluminum with an alumite-treated surface that has the same appearance as that of the conductive member 30 may be attached (adhered) to the outer surface of each of the secondary batteries 20 made of the non-conductive material (see FIG. 7(C)).

Further, each of the storage sections 41 is provided with at least two (specifically two in the first embodiment) detection sections 42. Depending on a storage state of each of the secondary batteries 20 in each of the storage sections 41, two detection sections 42 are in contact with the conductive member 30 (see FIG. 1(B)), or at least one detection section 42 is not in contact with the conductive member 30 (see FIG. 1(C)).

The secondary battery 20 is formed of a known cylindrical-type lithium ion secondary battery. In the battery pack 10, three secondary batteries 20 are parallel-connected, and seven secondary battery groups each configured of such parallel-connected secondary batteries 20 are series-connected. The detection section 42 is configured of a pin-like projection section made of a metal (specifically, for example, nickel-gold-plated iron) projecting from the storage section 41. The housing 40 having the plurality of storage sections 41 is made of a plastic material such as an ABS resin. The foregoing configuration is allowed to be obtained by integrally forming the housing 40 including the storage section 41, the detection section 42, and a wiring 43 extending from the detection section 42 to the outside of the housing 40. When the secondary batteries 20 are stored in the storage sections 41, the conductive member 30 is not allowed to be viewed (see FIG. 1(A)). Since the foregoing configuration is adopted, a conduction/non-conduction state of each of the secondary batteries 20 stored in the storage sections 41 is not allowed to be viewed from the outside. Therefore, in order to check a conduction/non-conduction state of each of the secondary batteries 20, each of the secondary batteries 20 should be taken out from each of the storage sections 41. In this case, in the case where the secondary batteries 20 are in a conduction state, the states thereof are allowed to be surely changed to non-conduction states.

The wiring 43 extending from the detection section 42 to the outside of the housing 40 is connected to the inspection circuit 50 included in the battery pack 10. The inspection circuit 50 includes a memory means 51 formed of an EEROM. The inspection circuit 50 further includes an MPU 52 and a programmable logic device (PLD) 53. An electric source of the inspection circuit 50 is the secondary batteries 20 configuring the battery pack 10. The inspection circuit 50 (more specifically, the PLD 53) sends a pulsed inspection signal to the detection section 42. By adopting the pulsed inspection signal, it becomes extremely difficult to externally analyze a method of monitoring a conduction/non-conduction state. The battery pack 10 includes a known battery protection circuit 54. Specifically, the battery protection circuit 54 is formed of a fuse. To stop a function of the battery pack 10, the battery protection circuit 54 is activated. In other words, the fuse is melted and cut under control of the MPU 52. Alternatively, a function of an over-discharge preventive switch and/or a function of an over-charge preventive switch included in the battery protection circuit 54 may be stopped. However, the configuration of the battery protection circuit 54 is not limited to the foregoing configuration.

The conductive member 30 is attached to an outer surface of each of the secondary batteries 20 so that a probability of a case in which two detection sections 42 are in contact with the conductive member 30 and a probability of a case in which at least one detection section 42 is not in contact with the conductive member 30 become a predetermined value, specifically 0.5 depending on a storage state of each of the secondary batteries 20 in each of the storage sections 41. More specifically, as illustrated in the conceptual view of FIG. 3(A), the conductive member 30 is adhered to a region with a length corresponding to 270 degrees along the circumference of the outer surface of the cylindrical-type secondary battery 20. Further, two or more detection sections 42 are provided in each of the storage sections 41 so that the probability of the case in which two detection sections 42 are in contact with the conductive member 30 and the probability of the case in which at least one detection section 42 is not in contact with the conductive member 30 become the predetermined value, specifically 0.5 depending on a storage state of each of the secondary batteries 20 in each of the storage sections 41. More specifically, two detection sections 42 are arranged separately by 90 degrees along the circumference of the outer surface of the cylindrical-type secondary battery 20.

Under the foregoing arrangement state, in the state illustrated in FIG. 3(A) (referred to as "arrangement state of 0 degree"), two detection sections 42 are in contact with the conductive member 30. Further, from "arrangement state of 90 degrees" obtained by rotating the secondary battery 20 by 90 degrees clockwise from "arrangement state of 0 degree" to "arrangement state of 180 degrees" obtained by rotating the secondary battery 20 by 180 degrees clockwise from "arrangement state of 0 degree," two detection sections 42 are in contact with the conductive member 30 (see FIGS. 3(B) and 3(C)). In the case where the secondary battery 20 is further rotated clockwise from "arrangement state of 180 degrees," at least one detection section 42 is not in contact with the conductive member 30 (see FIG. 3(D)). Further, in "arrangement state of 270 degrees," two detection sections 42 are in contact with the conductive member 30 (see FIG.

3(E)). In a state in which a rotating angle is other than 270 degrees and is less than 360 degrees, at least one detection section 42 is not in contact with the conductive member 30 (see FIG. 3(F)).

In the battery pack 10 of the first embodiment, each of 21 secondary batteries 20 is stored in each of the storage sections 41. With regard to each arrangement state thereof, each rotating angle obtained by rotating each secondary battery clockwise from "arrangement state of 0 degree" illustrated in FIG. 3(A) is inherently arbitrary (random), and depends on how each secondary battery is stored. Alternatively, each of 21 secondary batteries 20 may be stored in each of the storage sections 41 based on a data string configured of "0" and "1" that are previously determined based on random digits. Further, attachment of the conductive member 30 to the outer surface of each of the secondary batteries 20 made of a non-conductive material is also arbitrary (random). In the case where all secondary batteries 20 are stored in the storage sections 41, the storage sections 41 are contained in the main body section 11 of the battery pack 10, and thereover, a printed-wiring board 55 to which the MPU 52 and the like are attached is attached to the main body section 11 by an appropriate method (see FIG. 2(B)). The main body section 11 is covered with a closing member (specifically, a cover) 12, a fixing member (for example, a screw) 13 is threadably mounted on a fixing section (for example, a bush 14A provided with a tap section 14B) provided in the main body section 11 (see FIGS. 2(A) and 2(B)). It is to be noted that referential number 15 represents an identification (a serial ID or a barcode) adhered to a side wall of the main body section 11, and referential number 16 represents an output section. It is to be noted that though the battery pack 10 includes a known control circuit for controlling charge and discharge of the secondary batteries, such a control circuit is not illustrated. Though the shape of the main body section 11 is inherently arbitrary, the shape thereof is a rectangular solid in the first embodiment. An opening for taking the plurality of secondary batteries 20 in and out of the main body section 11 is provided on the top surface of the main body section 11, and the opening is sealed with the closing member 12. However, the opening may be provided on a side surface of the main body section 11, or may be provided on the bottom surface of the main body section 11.

After the battery pack 10 is assembled, the inspection circuit 50 is activated, specifically, the MPU 52 and the PLD 53 are activated, and pulsed inspection signals are sequentially sent to the inspection section 42 (see FIGS. 4(A) and 4(B)). Further, the secondary batteries 20 with the conductive member 30 in contact with two detection sections 42 and the secondary batteries 20 with the conductive member 30 not in contact with at least one detection section 42 are detected, and the contact states of the foregoing all secondary batteries 20 are memorized in the memory means 51, as data, specifically, as a conduction/non-conduction initial value. The conduction/non-conduction initial value may be encrypted and the encrypted value may be memorized in the memory means 51. In this case, since the number (N) of the secondary batteries 20 is 21, the data thereof is 21-bit data. Specifically, for example, in the case where the secondary battery 20 with the conductive member 30 in contact with two detection sections 42 is set to data "1," and the secondary battery 20 with the conductive member 30 not in contact with at least one detection section 42 is set to data "0," a data string of 21 data configured of "1" and "0" is memorized in the memory means 51. The data string configuring the conduction/non-conduction initial value is an inherently-arbitrary (random) data string. It is to be noted that the secondary battery 20 with the conductive member 30 in contact with two detection sections 42 is referred to as "secondary battery in a contact state" for convenience, and the secondary battery 20 with the conductive member 30 not in contact with at least one detection section 42 is referred to as "secondary battery in a non-contact state" for convenience.

Further, in the method of inspecting a storage state of a secondary battery in a battery pack of the first embodiment, a conduction/non-conduction state between detection sections in each of the secondary batteries 20 is examined. The examined result is compared to the previously found conduction/non-conduction initial value as described above. In the case of mismatch thereof, the conduction/non-conduction initial value is changed.

Specifically, a conduction/non-conduction state between detection sections in each of the secondary batteries 20 is examined at predetermined time intervals. It is to be noted that such operation of examining a conduction/non-conduction state between detection sections in each of the secondary batteries 20 may be started by detecting a fact that the fixing member (screw) 13 is removed from the fixing section (the bush 14A provided with the tap section 14B) provided in the main body section 11 as a trigger, as illustrated in the schematic and partial cross sectional views of the main body section 11, the closing member (cover) 12, and the like in FIGS. 6(A) and 6(B), for example. For example, the fact that the fixing member 13 is removed from the bush 14A may be detected by a method of detecting non-conduction between the bush 14A and the fixing member 13 by the fact that the fixing member 13 is removed from the bush 14A provided with the tap section 14B.

Specifically, the main body section 11 is made of a non-conductive material (insulating material) such as a plastic material. Further, the bush 14A made of a conductive material, specifically, a metal or an alloy (more specifically, stainless steel) is attached to the fixing section to which the fixing member 13 is attached in the main body section 11. The bush 14A is connected to the inspection circuit 50 through a first wiring 17 and an unillustrated connector. It is to be noted that the first wiring 17 is attached to the bush 14A by welding. The bush 14A is engaged with the fixing member 13. Such a configuration is allowed to be obtained by integrally forming the bush 14A and the main body section 11. Further, the closing member 12 is made of a non-conducive material (insulating material) such as a plastic material. The fixing member 13 attached to the closing member 12 is connected to the inspection circuit 50 through second wirings 18A and 18B and an unillustrated wiring. Specifically, the fixing member 13 is grounded through the second wirings 18A and 18B and the unillustrated wiring. One end of the unillustrated wiring is electrically connected to the first wiring 18A through a fixing screw (not illustrated) made of a stainless steel. A part of the second wiring 18B is provided with a through-hole 19 for the passage of the fixing member 13. Such a configuration is allowed to be obtained by integrally forming the second wirings 18A and 18B and the closing member 12. The fixing member 13 is formed of a screw made of a conductive material (for example, a metal or an alloy), specifically a screw made of stainless steel.

Based on the foregoing trigger, more specifically based on an action of an unillustrated timer included in the inspection circuit 50, the MPU 52 and the PLD 53 are activated to sequentially send pulsed inspection signals to the detection sections 42 in the respective storage sections 41. Further, the secondary batteries 20 in a contact state and the secondary batteries 20 in a non-contact state are detected. As a predetermined time interval, 1 second may be exemplified. However, the predetermined time interval is not limited to the foregoing value. In the case where the foregoing time interval is adopted, a state that the secondary battery 20 is taken out from the storage section 41 is securely allowed to be detected. Further, the inspection circuit 50 obtains a conduction/non-conduction state data string (referred to as "inspection result data string" for convenience). The MPU 52 compares the inspection result data string to the conduction/non-conduction initial value memorized in the memory means 51. If the comparative results are identical, the inspection circuit 50 performs no particular process.

In the case where the secondary battery 20 in a contact state is taken out from the storage section 41, the detection sections 42 in the storage section 41 storing the foregoing secondary battery 20 become in a non-conduction state. Therefore, the bit corresponding to such a secondary battery 20 is changed from "1" to "0." Accordingly, the inspection result data string is not matched with the conduction/non-conduction initial value. In the case where the foregoing state occurs, the MPU 52 changes the conduction/non-conduction initial value, and the changed conduction/non-conduction initial value is memorized in the memory means 51.

Meanwhile, in the case where the secondary battery 20 in a non-contact state is taken out from the storage section 41, the detection sections 42 in the storage section 41 storing the foregoing secondary battery 20 is originally in a non-conduction state. Therefore, the inspection result data string is not unmatched with the conduction/non-conduction initial value. A possibility thereof is, for example, 0.5. However, in the case where replacement of the secondary batteries 20 in the battery pack 10, repair of the battery pack 10, and/or the like is made, in general, many secondary batteries 20 are taken out from the storage sections 41. In the case where alteration of the battery pack is made, many secondary batteries 20 are taken out from the storage sections 41 as well. In these cases, the secondary batteries 20 are stored in the storage sections 41 again. Therefore, in the case where the secondary batteries 20 are taken out from the storage sections 41, a possibility that the inspection result data string is not unmatched with the conduction/non-conduction initial value is extremely small. Further, in the case where a secondary battery in a non-contact state is taken out from the storage section 41 in a state of short-circuit between two detection sections 42 in some way, the bit corresponding to such a secondary battery is changed from "0" to "1" immediately after short-circuit. Thereby, the MPU 52 changes the conduction/non-conduction initial value, and the changed conduction/non-conduction initial value is memorized in the memory means 51. Therefore, in the case where a secondary battery in a non-contact state is taken out from the storage section 41 in a state of short-circuit between two detection sections 42 in some way as described above, a possibility that the inspection result data string is not unmatched with the conduction/non-conduction initial value is extremely small as well.

A method of changing the conduction/non-conduction initial value is inherently arbitrary. For example, as illustrated in FIG. 5(A), in the case where the secondary battery 20 of the n-th order (1≤n≤N is satisfied, and n is 8 in the example illustrated in FIG. 5(A)) is taken out, the bit of the n-th order in the conduction/non-conduction initial value of N bits is inverted, and the bit of the (n−m)-th order and the bit of the (n+m')-th order (the seventh bit and the ninth bit in the example illustrated in FIGS. 5(A) and 5(B)) are inverted. Specifically, in the case where a bit before being inverted is "0," the bit becomes "1" after being inverted. On the other hand, in the case where a bit before being inverted is "1," the bit becomes "0" after being inverted. Further, the data string obtained as above is memorized in the memory means 51, as a changed conduction/non-conduction initial value. It is to be noted that a value of "m" and a value of "m'" may be, for example, previously determined under a certain rule correspondingly to the identification of the battery pack. Alternatively, a manufacturer and/or the like may record and archive them correspondingly to the identification of the battery pack. Further, the number of bits to be changed may be previously determined under a certain rule correspondingly to the identification of the battery pack. Alternatively, a manufacturer and/or the like may record and archive the same correspondingly to the identification of the battery pack.

An assumption is made as follows. The secondary battery 20 is taken out from the storage section 41, and thereafter, a/the secondary battery 20 is stored in the storage section 41 again. It is to be noted that the stored secondary battery 20 may be the secondary battery previously taken out, or may be a different secondary battery. In any case, the inspection circuit 50 examines a conduction/non-conduction state between the detection sections in the secondary battery 20, and compares the examined result to the conduction/non-conduction initial value with the changed inspection result data string. If the examined result is not matched with the changed conduction/non-conduction initial value, a function of the battery pack 10 is stopped. Typically, the examined result is not matched with the changed conduction/non-conduction initial value.

Accordingly, in the case where once the secondary battery 20 is taken out from the storage section 41 and thereafter, a/the secondary battery 20 is stored in the storage section 41 again, even if any of the secondary batteries 20 is stored, or even if the stored secondary battery has the same contact state/non-contact state as that of the secondary battery 20 taken out from the storage section 41, the fact that the secondary battery 20 is taken out from the storage section 41 is allowed to be detected, and the fact that the battery pack is an altered battery pack is confirmed. Accordingly, the battery protection circuit 54 is activated to stop the function of the battery pack 10.

In the case where replacement of the secondary batteries 20 in the battery pack 10, repair of the battery pack 10, and/or the like is made by a manufacturer and/or the like, for example, in the case where the secondary battery 20 is taken out from the storage section 41 of the n-th order, as described above, the inspection result data string is not matched with the conduction/non-conduction initial value. Therefore, the MPU changes the conduction/non-conduction initial value, and the changed conduction/non-conduction initial value is memorized in the memory means 51. However, the manufacturer and/or the like knows the rule under which the conduction/non-conduction initial value is changed. Therefore, the manufacturer and/or the like is allowed to rewrite the changed conduction/non-conduction initial value as the original conduction/non-conduction initial value except for the bit of the n-th order. In the case where the upper limit of the rewritable number is previously determined and the number of rewriting works exceeds the upper limit of the rewritable number, the battery protection circuit 54 may be activated to stop the function of the battery pack 10. Further, in the case where a/the secondary battery 20 is stored in the storage section 41 again, the inspection circuit 50 examines a conduction/non-conduction state between the detection sections in the secondary battery 20, and writes the value of the bit of the n-th order into the conduction/non-conduction initial value. Accordingly, replacement of the secondary batteries 20 in the battery pack 10, repair of the battery pack 10, and/or the like is completed.

Alternatively, in the case where replacement of the secondary batteries 20 in the battery pack 10, repair of the battery pack 10, and/or the like is made by a manufacturer and/or the like, the following form may be adopted. In the form, in the case where the secondary battery 20 is taken out from the storage section 41, and thereafter, a/the secondary battery 20 is stored in the storage section 41, a conduction/non-conduction state between the detection sections in the secondary battery is examined. The examined result is compared to the changed conduction/non-conduction initial value. If examined result is not matched with the changed conduction/non-conduction initial value, conduction/non-conduction states between the respective detection sections in the all secondary batteries 20 are examined under predetermined conditions. The result is set to a new conduction/non-conduction initial value, and stop of the function of the battery pack 10 is released. In this case, as "under predetermined conditions," for example, input of a password previously determined by a manufacturer and/or the like may be exemplified.

The present invention has been described with reference to the preferred embodiment. However, the present invention is not limited to the foregoing embodiment. The configurations and the structures of the battery pack, the secondary battery, the housing, the conductive member, the detection section, the inspection circuit, and/or the like are merely exemplifications, and may be changed as appropriate. For example, in the embodiment, the cylindrical-type secondary battery is used. However, as illustrated in FIGS. 7(A) to 7(D), a secondary battery 120 may be formed of a known square-type lithium ion secondary battery. FIG. 7(A) illustrates the secondary battery 120 with the conductive member 30 in contact with two detection sections 42, and FIG. 7(B) illustrates the secondary battery 120 with the conductive member 30 not in contact with at least one detection section 42. Further, FIG. 7(C) illustrates the secondary battery 120 with the non-conductive member 31 in contact with two detection sections 42, and FIG. 7(D) illustrates the secondary battery 120 with the conductive member 30 not in contact with two detection sections 42. It is to be noted that the secondary battery 120 in FIG. 7(A) is stored in the storage section 41 in an inverted state with respect to the secondary battery 120 in FIG. 7(D). Whether the secondary battery 120 is in the storage state illustrated in FIG. 7(A) or in the storage state illustrated in FIG. 7(D) is inherently arbitrary (random), and depends on how each secondary battery is stored.

Further, as described above, the method of changing the conduction/non-conduction initial value is inherently arbitrary. In the embodiment, as the method of changing the conduction/non-conduction initial value, a predetermined bit value is inverted. However, a method of adding a predetermined data string to the conduction/non-conduction initial value, a method of subtracting a predetermined data string from the conduction/non-conduction initial value, a method of multiplying a predetermined data string by the conduction/non-conduction initial value, a method of shifting a bit, or the like may be adopted, or a combination of the foregoing methods may be adopted. The descriptions of the position relation between the detection section and the conductive member and the like are exemplifications, which may be changed as appropriate. Further, the number of the detection sections per one secondary battery is not limited to two, and three or more detection sections may be used. Thereby, a length (bit length) of a data string configuring the conduction/non-conduction initial value is allowed to be extremely increased.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of inspecting a storage state of a secondary battery in a battery pack, the battery pack including a plurality of secondary batteries and
   a housing, the housing having a plurality of storage sections and containing the secondary batteries in the respective storage sections,
   a conductive member being attached to an outer surface of each of the secondary batteries made of a non-conductive material, wherein the conductive member is an aluminum strip and is electrically disconnected with each of the secondary batteries,
   each of the storage sections being provided with at least two same detection sections connected with the housing on a same side, and
   depending on a storage state of each of the secondary batteries in each of the storage sections, two of the at least two same detection sections being in contact with the conductive member indicates a first initial value, or at least one of the at least two same detection sections being not in contact with the conductive member indicates a second initial value, and the first initial value and the second initial value are stored in a memory of the battery pack,
   the method comprising:
   examining a conduction/non-conduction state between the detection sections in each of the secondary batteries;
   comparing an examined result to a previously found conduction/non-conduction initial value; and
   changing, in the case of mismatch thereof, the previously found conduction/non-conduction initial value.

2. The method of inspecting a storage state of a secondary battery in a battery pack according to claim 1, wherein the mismatch of the conduction/non-conduction initial value occurs from taking out any of the secondary batteries from any of the storage sections.

3. The method of inspecting a storage state of a secondary battery in a battery pack according to claim 2, wherein when any of the secondary batteries is taken out from any of the storage sections, and thereafter, a/the secondary battery is stored in the storage section, a conduction/non-conduction state between detection sections in the secondary battery is examined, an examined result thereof is compared to a changed conduction/non-conduction initial value, and a function of the battery pack is stopped in the case of mismatch thereof.

4. The method of inspecting a storage state of a secondary battery in a battery pack according to claim 1, wherein
   the battery pack further includes a memory means, and
   conduction/non-conduction states between detection sections in all secondary batteries are examined, and examined results thereof are memorized in the memory means, as the conduction/non-conduction initial value.

5. The method of inspecting a storage state of a secondary battery in a battery pack according to claim 1, wherein the conduction/non-conduction state between the detection sections in each of the secondary batteries is examined at predetermined time intervals.

6. A battery pack comprising:
a plurality of secondary batteries; and
a housing, the housing having a plurality of storage sections and containing the secondary batteries in the respective storage sections, wherein
a conductive member is attached to an outer surface of each of the secondary batteries made of a non-conductive material, wherein the conductive member is an aluminum strip and is electrically disconnected with each of the secondary batteries,
each of the storage sections is provided with at least two same detection sections connected with the housing on a same side, and
depending on a storage state of each of the secondary batteries in each of the storage sections, two of the at least two same detection sections being in contact with the conductive member indicates a first initial value, or at least one of the at least two same detection sections being not in contact with the conductive member indicates a second initial value, and the first initial value and the second initial value are stored in a memory of the battery pack.

7. The battery pack according to claim 6, wherein the conductive member is attached to the outer surface of each of the secondary batteries so that a probability of a case in which the two detection sections are in contact with the conductive member and a probability of a case in which at least one detection section is not in contact with the conductive member become a predetermined value depending on the storage state of each of the secondary batteries in each of the storage sections.

8. The battery pack according to claim 6, wherein two or more detection sections are provided in each of the storage sections so that the probability of the case in which the two detection sections are in contact with the conductive member and the probability of the case in which at least one detection section is not in contact with the conductive member become the predetermined value depending on the storage state of each of the secondary batteries in each of the storage sections.

9. The battery pack according to claim 6, wherein a non-conductive member is attached to the outer surface of each of the secondary batteries made of the non-conductive material, the non-conducive member having the same appearance as that of the conductive member.

10. The battery pack according to claim 6 further comprising:
a memory means, wherein a secondary battery with a conductive member in contact with two detection sections and a secondary battery with a conductive member not in contact with at least one detection section are memorized in the memory means as data depending on the storage state of each of the secondary batteries in each of the storage sections.

11. The battery pack according to claim 10, wherein when the number of the secondary batteries is N, the data is N-bit data.

12. The battery pack according to claim 6, wherein when the secondary batteries are contained in the storage sections, the conductive member is not allowed to be viewed.

13. The battery pack according to claim 6, wherein the conductive member is a seal member made of a conductive material.

14. A battery pack comprising:
a plurality of secondary batteries;
a housing, the housing having a plurality of storage sections and containing the secondary batteries in the respective storage sections; and
an inspection circuit, wherein
a conductive member is attached to an outer surface of each of the secondary batteries made of a non-conductive material, wherein the conductive member is an aluminum strip and is electrically disconnected with each of the secondary batteries,
each of the storage sections is provided with at least two same detection sections connected with the housing on a same side,
depending on a storage state of each of the secondary batteries in each of the storage sections, two of the at least two same detection sections being in contact with the conductive member indicates a first initial value, or at least one of the at least two same detection sections being not in contact with the conductive member indicates a second initial value, and the first initial value and the second initial value are stored in a memory of the battery pack, and
the inspection circuit examines a conduction/non-conduction state between the detection sections in each of the secondary batteries, compares an examined result to a previously found conduction/non-conduction initial value, and in the case of mismatch thereof, changes the previously found conduction/non-conduction initial value.

15. The battery pack according to claim 6, wherein the conductive member is an open-ended member.

16. The battery pack according to claim 14, wherein the conductive member is an open-ended member.

17. The battery pack according to claim 6, wherein the aluminum strip of the conductive member is adhered to the outer surface of each of the secondary batteries.

* * * * *